United States Patent [19]

Koelsch

[11] Patent Number: 4,881,829
[45] Date of Patent: Nov. 21, 1989

[54] SUBMERSIBLE BEARING ASSEMBLY

[76] Inventor: Lester M. Koelsch, 175 Ridge Ct., Pewaukee, Wis. 53072

[21] Appl. No.: 73,958

[22] Filed: Jul. 15, 1987

Related U.S. Application Data

[63] Continuation of Ser. No. 880,562, Jun. 30, 1986, abandoned.

[51] Int. Cl.$^4$ .................. F16C 33/72; F16C 33/76; F16C 33/80
[52] U.S. Cl. ........................... 384/448; 277/2; 277/53; 277/59; 277/65; 277/79; 277/92; 384/462; 384/480; 384/481; 384/499
[58] Field of Search ............. 277/70, 74, 92, 95, 277/53, 55, 56, 135, 2, 15, 72 R, 12, 59, 65, 58, 71, 79; 384/132, 144, 480, 479, 139, 481, 143, 499, 584, 904, 501, 559, 397–401, 403, 471, 477, 480, 481, 448, 462, 474; 73/61 R, 64

[56] References Cited

U.S. PATENT DOCUMENTS

| | | | |
|---|---|---|---|
| 132,395 | 10/1872 | Gross | 384/398 |
| 961,419 | 6/1910 | Muchka | 73/61 R |
| 1,340,310 | 5/1920 | Wolff | 384/398 |
| 1,481,705 | 1/1924 | Gimeno | 384/559 |
| 1,676,894 | 7/1928 | Frank | 384/474 |
| 1,747,867 | 2/1930 | Gregovsky | 384/501 |
| 2,016,832 | 10/1935 | Hyatt et al. | 73/61 R X |
| 2,033,156 | 3/1936 | Shafer | 384/584 |
| 2,230,989 | 2/1941 | Barish | 384/499 |
| 2,249,501 | 7/1941 | Teker | 384/474 |
| 2,281,905 | 5/1942 | Young | 384/480 X |
| 2,510,549 | 6/1950 | Buchi | 384/398 |
| 2,853,020 | 9/1958 | Hollinger et al. | 277/71 X |
| 3,127,181 | 3/1964 | Crego et al. | 277/15 |
| 3,241,843 | 3/1966 | Hatch et al. | 277/92 |
| 3,447,843 | 6/1969 | Shipman | 384/144 |
| 3,578,111 | 5/1971 | Miller | 277/92 X |
| 3,588,124 | 6/1971 | Guinard | 277/15 X |
| 3,625,309 | 12/1971 | Lovold | 384/398 X |
| 3,921,962 | 11/1975 | Feger et al. | 277/92 X |
| 3,971,565 | 7/1976 | Schickling et al. | 277/59 |
| 4,111,436 | 9/1978 | Yazawa | 277/92 |
| 4,348,067 | 9/1982 | Tooley | 384/144 X |
| 4,575,265 | 3/1986 | Tooley | 384/474 |

FOREIGN PATENT DOCUMENTS

| 1101071 | 3/1961 | Fed. Rep. of Germany. | |
| 482873 | 4/1938 | United Kingdom | 277/56 |

Primary Examiner—Allan N. Shoap
Attorney, Agent, or Firm—Quarles & Brady

[57] ABSTRACT

A submersible bearing assembly for a shaft includes a stationary housing that is horizontally split and a roller bearing mounted within the housing and which is also horizontally split. One end of the housing is closed and the other is open. A labyrinth seal seals the open end of the housing and has internal O-rings engaged with and sealing against the shaft. A seal chamber is mounted about the shaft adjacent the open end. The chamber includes a cartridge seal ring that is bolted to the housing about the open end, a shaft seal ring that is axially spaced from the cartridge ring and mounted upon and sealed to the shaft, and a chamber seal surrounding the shaft in the space between the cartridge seal ring and shaft seal ring and which seals against both rings. The chamber seal is formed of a pair of halves each including a rigid portion with a flat radial surface in contact with the like surface of the other half and a flexible portion that seals with a respective ring and urges the rigid portions into contact. A lubricating fluid is disposed in the seal chamber and means are provided for circulating the lubricating fluid through the chamber and for allowing visual inspection of the circulated fluid.

11 Claims, 2 Drawing Sheets

SUBMERSIBLE BEARING ASSEMBLY

This is a continuation of application Ser. No. 880,562, filed June 30, 1986, now abandoned.

BACKGROUND OF THE INVENTION

This invention relates to shaft bearing blocks, and particularly to a bearing block that is usable in partially or fully submerged conditions and which is constructed so as to prevent the entry of diliterious fluids into the bearing.

There are instances of use in which it is necessary to mount a shaft in a bearing which is either fully submerged or partially submerged within water or other liquid which would be harmful to the bearing surfaces. An example is a bearing for a shaft which mounts a rotating biological contactor that rotates within a pool of wastewater to be treated. It is important to prevent the migration of wastewater or other liquid into the bearing and the bearing surfaces. Many approaches have been used in the past to attempt to prevent the entry of the contaminating fluid but none have proven fully satisfactory. As a result, the conventional approach has been to use bearings either formed of or clad with stainless steel or other material which would not be attacked by the migrating liquid.

I provide a bearing which has positive elements to prevent migration along the length of the shaft to the interior of the bearing and also will prevent entry of fluid from the environment surrounding the bearing.

SUMMARY OF THE INVENTION

In accordance with the invention, I provide a submersible bearing for a shaft that includes a housing open at one end to accept the shaft, a bearing within the housing, a housing seal at the open end of the housing that is adapted to be mounted on and rotate with the shaft, and a seal chamber outside the housing that includes a seal ring joined to the open end of the housing about the housing seal, a second seal ring that is adapted to be mounted on and rotate with the shaft, and a chamber seal about the shaft between the rings and sealing with the seal rings.

In the preferred embodiment, the housing seal is a labyrinth seal, and both it and the second seal ring have O-rings at their inner surfaces for sealing with the shaft. The chamber seal is preferably formed of two halves each including a rigid portion with a flat radial surface in contact with the like surface of the other half, and a flexible portion that seals with a respective seal ring and urges the rigid portions together. The chamber assembly is filled with a low viscosity lubricating fluid, and the fluid may be pumped into and out of the chamber assembly to both filter the fluid and allow for visual inspection to determine if the lubricating fluid is being contaminated by fluid from the surrounding environment.

It is a principal object of the invention to provide a shaft bearing which can be wholly or partially submerged in a fluid which would be detrimental to the bearing element and which has protection against the entry of the fluid into the bearing elements.

It is another object of the invention to provide such a shaft bearing in which roller, ball or bushing type, bearings are protected against the migration of fluid along the length of the shaft and the entry of fluid from the surrounding environment.

It is a further object of the invention to provide a submersible shaft bearing in which the ingress of a fluid into the bearing from the environment can be visually detected.

The foregoing and other objects and advantages of the invention will appear in the detailed description which follows. In the description reference is made to the accompanying drawings which illustrate a preferred embodiment of the invention.

DETAILED DESCRIPTION OF THE PREFERRED EMBODIMENT

Figure 1:
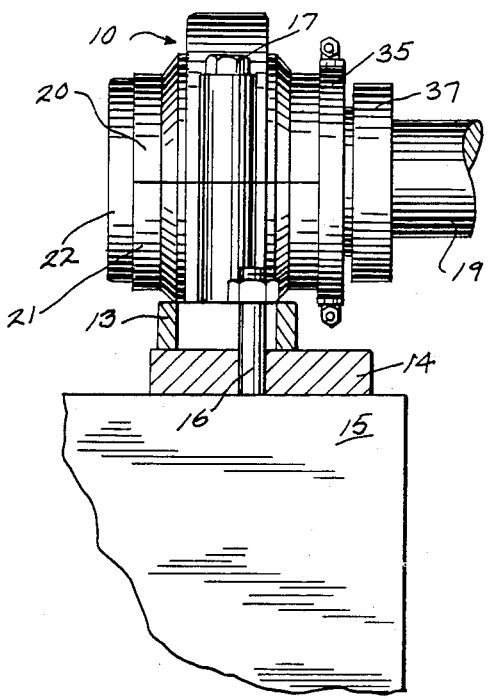
FIG. 1 is a view in side elevation of a bearing in accordance with the invention shown mounted on a structural support.
Figure 2:
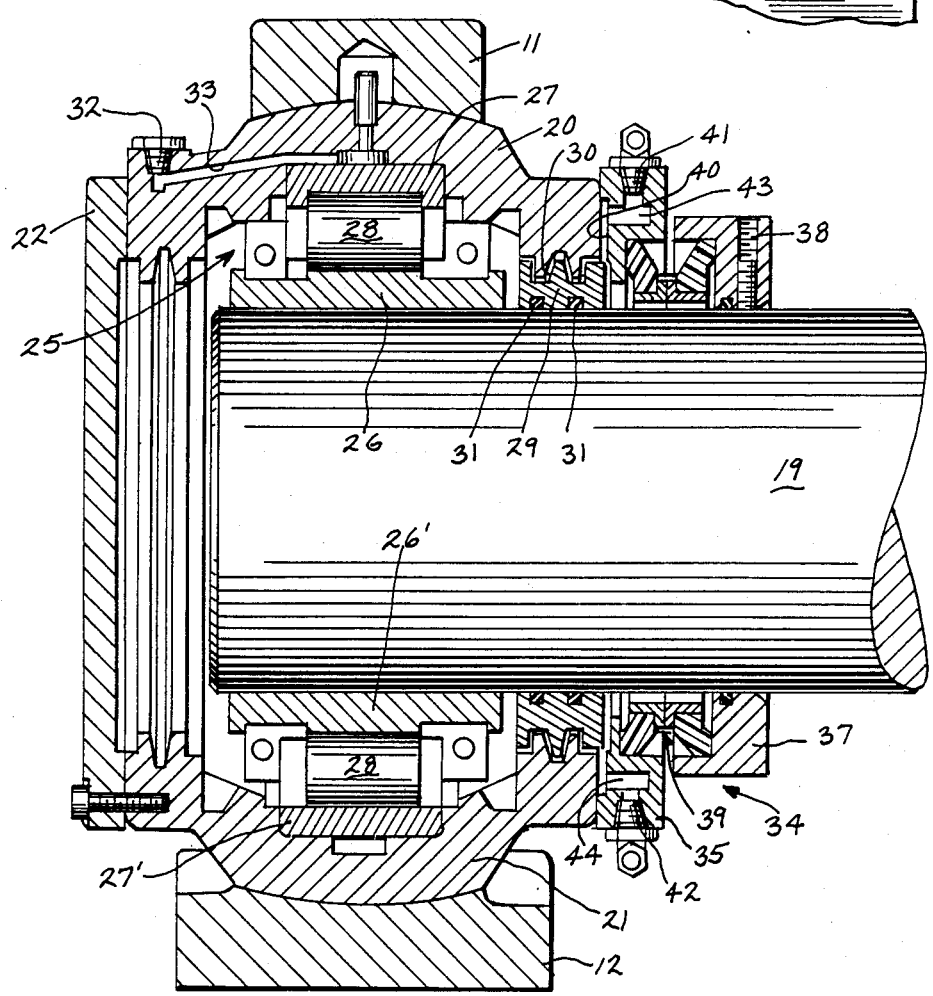
FIG. 2 is a view in vertical section of the bearing of FIG. 1 to an enlarged scale.

Referring to the drawings, the bearing includes a split housing 10 that includes an upper housing section 11 and a lower housing section 12. The lower housing section 12 includes a integral base 13 that can rest upon a base plate 14 which in turn is mounted on a structural support 15. The base 13 of the housing 10 is attached to the support 15 by anchor bolts 16. The upper housing section 11 is joined to the lower housing section 12 by cap screws 17 which extend into the lower section. The upper and lower sections are joined at a horizontal line of separation 18 which extends through the center of the bearing and through the center of a shaft 19 to be mounted in the bearing. The housing 10 is completed by split upper and lower bearing cartridges 20 and 21. As shown in FIG. 2, one end of the housing 10 is closed by an end cap 22 bolted to the cartridges 20 and 21 while the shaft 19 extends through the other open end of the housing.

Mounted within the housing 10 is a horizontally split roller bearing assembly 25 including split inner races 26 and 26' adapted to surround the shaft 19, split outer races 27 and 27' and a plurality of rollers 28. The outer races 27 and 27' are captured in upper and lower bearing cartridges 20 and 21, respectively.

The open end of the housing 10 mounts a housing seal in the form of a triple labyrinth seal 29 whose labyrinth surfaces 30 are machined and mate with similar machined surfaces in the bearing cartridges 20 and 21. The labyrinth seal 30 is sealed with the shaft by a pair of axially spaced O-rings 31. The labyrinth seal 30 is stationary on the shaft 19 by reason of a close fit with the shaft and the resistance of the O-rings 31. The interior of the housing 10 with the roller bearing assembly 25 is lubricated by grease which can be applied through a port 32 that connects to a passage 33 leading to the interior of the housing. The grease will fill the housing cavity up to the labyrinth seal 29.

A sealing chamber assembly 34 is disposed outside the housing 10 about the open end. The chamber assembly 34 includes a cartridge seal ring 35 mounted to the face of the housing 10 around the labyrinth seal 29 by bolts 36, a shaft seal ring 37 spaced from the cartridge seal ring 35 and connected to the shaft 19 by a set screw 38, and a two part chamber seal 39 sealing between the seal rings 35 and 37. The cartridge seal ring 35 has an inner annular opening 40 which is spaced from the shaft 19. Upper and lower threaded lubricant ports 41 and 42, respectively, extend radially into the cartridge seal ring 35 and lead to respective passages 43 and 44 between the cartridge seal ring 35 and the housing 10. The cartridge seal ring 35 includes an annular dished portion 45 which receives one flexible gland 46 of the chamber seal 39. The flexible gland 46 is bonded to an annular L-shaped rigid seal portion 48 having a flat radial face 49 which bears against a like radial face 49' in the second rigid seal portion 48'. The flexible gland 46' of the second seal portion is seated in an annular recess 50 of the shaft seal ring. The shaft seal ring 37 mounts an O-ring seal 53 which seals with the perimeter of the shaft 19.

The flexible glands 46 and 46' may be formed of natural or synthetic rubber or other elastomers. The rigid seal portions 48 and 48' are preferably formed of stainless steel. The glands 46 and 46' will tend to seat themselves within the recesses of the sealing rings 35 and 37 and will also tends to urge the two radial faces 49 and 49' together. The interior of the entire sealing chamber 34 formed between the shaft seal ring 37 and the end of the housing 10, including the interior of the chamber seal 39, is filled with the low viscosity lubricating fluid.

Figure 3:
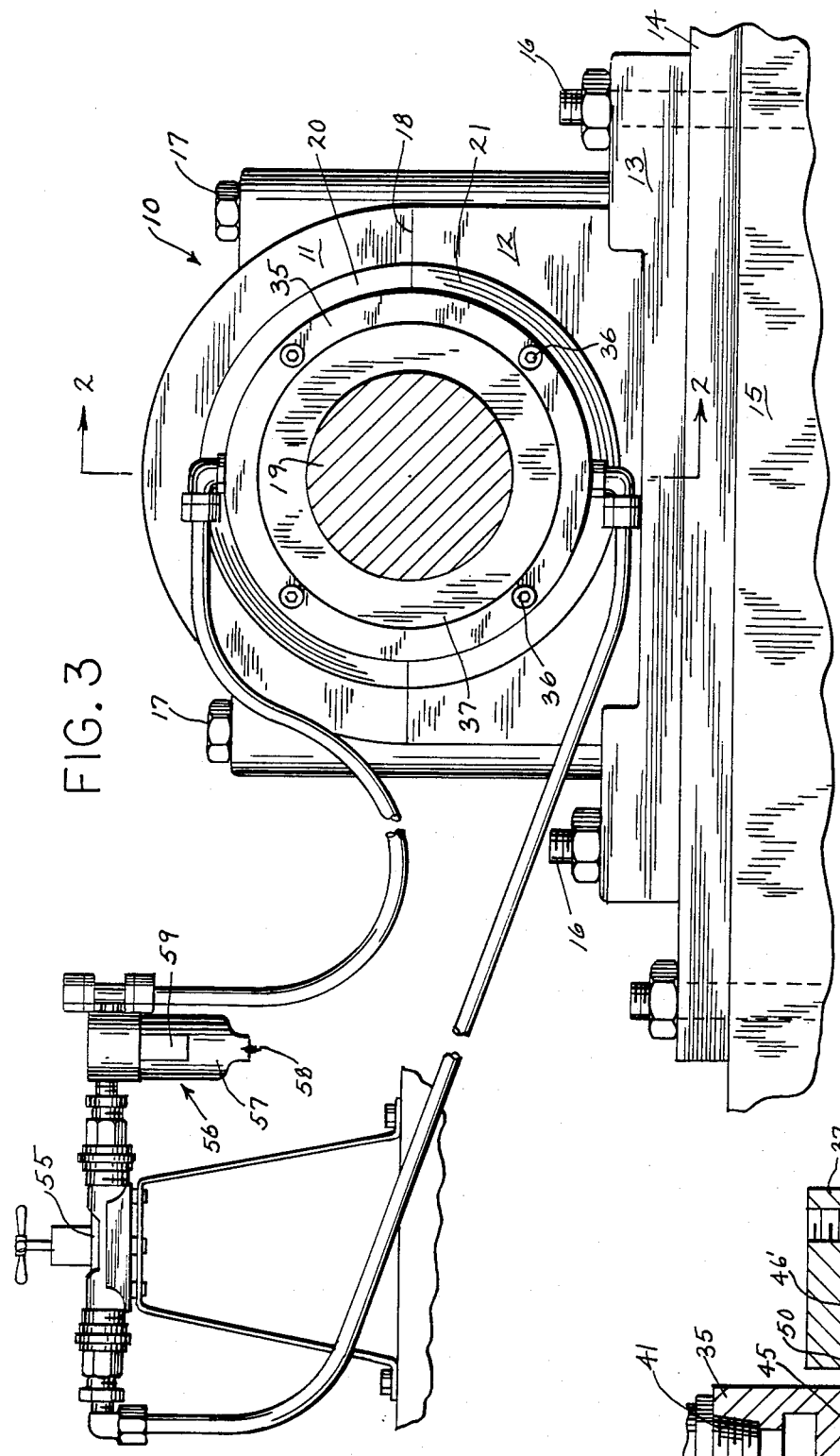
FIG. 3 is a view in front elevation of the bearing of FIG. 1 and illustrating the arrangement for pumping a low viscosity fluid through a seal chamber on the bearing.
Figure 4:
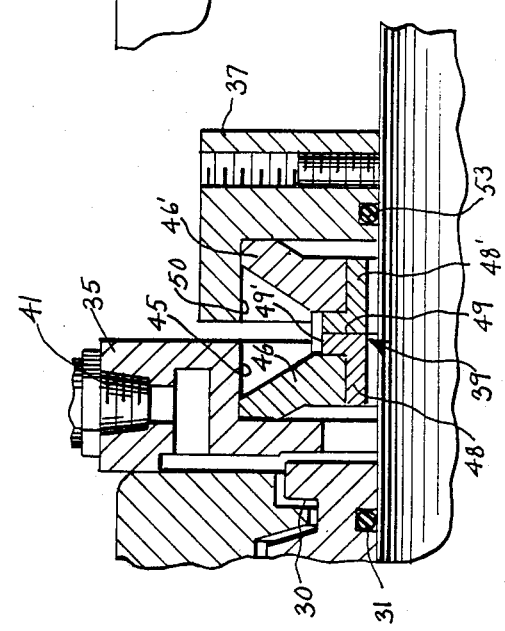
FIG. 4 is a view in vertical section to an enlarged scale of the sealing chamber of the bearing.

The lubricating fluid may be pumped into and out of the sealing chamber 34 for filtering the fluid and also for visual inspection as to whether the fluid is contaminated by water or other liquid from the surrounding environment. To this end, the upper and lower ports 41 and 42 are connected by suitable flexible tubing and tube connections (as shown in FIG. 3) to a hand driven pump 55 and a filter/separator 56 mounted in series between the ports 41 and 42. The filter/separator 56 includes a clear bottle 57 having a manual drain 58 at its bottom. A filter 59 is disposed in the bottle 57. Fluid circulated by hand manipulation of the pump 55 will pass through the clear bottle 57 and then through the filter 59. The circulating fluid will be visible in the clear bottle so that it can be determined if there is any contamination with water or other liquids from the environment. Any sedimentation can be removed through the drain 58.

The O-rings 31 of the labyrinth seal 29 and the O-ring 53 of the shaft seal ring 37 are stationary with respect to the shaft 19. As a result, the O-rings will effectively prevent any flow of lubricating liquids or contaminating liquids axially along the shaft 19. The two seal rings 35 and 37 of the chamber assembly 34 will rotate relative to each other since one ring is stationary with the housing 10 and the other rotates with the shaft 19. The two portions of the chamber seal 39 are free to rotate or be stationary. As a result, the two portions will seek the best condition for sealing at the innerface of the surfaces 49 and 49'. The low viscosity lubricating fluid in the seal chamber will lubricate the interface between the surfaces 49 and 49' and will also resist the ingress of any fluids from outside the bearing. However, if the interface should fail or fluid from the surrounding environment should otherwise enter the seal chamber 34, its presence can be detected before it can contaminate the roller bearing.

Although the preferred embodiment of the bearing is shown as using straight roller bearings, it could also use tapered roller bearings, ball bearings or sleeve bushings. Furthermore, the bearing could be adapted to support a through shaft. In that case, the housing would have two open ends and a labyrinth seal and a seal chamber would be provided at both ends of the housing.

I claim:

1. A submersible shaft bearing assembly comprising:
   a stationary housing defining a bearing chamber with an opening at one end;
   a bearing mounted within the chamber in the housing;
   a housing seal sealing the open end of the housing, the housing seal being adapted to be mounted on and to rotate with a shaft;
   a seal chamber outside the housing and in communication with one side of the housing seal, said seal chamber including a cartridge seal ring attached to the housing at the open end and about the housing seal, a shaft seal ring spaced from the cartridge seal ring and adapted to be mounted on and to rotate and seal with the shaft, and a chamber seal disposed about and spaced from the shaft, said chamber seal sealing with both the stationary cartridge seal ring and the rotatable shaft seal ring;
   a low viscosity lubricating fluid in the seal chamber; and
   means for pumping the lubricating fluid into and out of said seal chamber and for visually inspecting the fluid for contamination as it is pumped.

2. A bearing assembly in accordance with claim 1 wherein said housing seal is a labyrinth seal.

3. A bearing assembly in accordance with claim 2 wherein said labyrinth seal includes an O-ring at its inner surface adapted to be in contact with the shaft.

4. A bearing assembly in accordance with claim 1 wherein said shaft seal ring includes an O-ring at its inner surface adapted to be in contact with the shaft.

5. A bearing assembly in accordance with claim 1 wherein said chamber seal includes a pair of seal halves each including a rigid portion having a flat radial surface in contact with the surface of the other half, and a flexible portion that seals with a respective ring and urges the rigid portions together.

6. A pillow block bearing assembly for a shaft, comprising:
   a stationary housing open at one end;
   a roller bearing mounted in said housing;
   a housing seal sealing the open end of the housing and adapted for mounting on said shaft to rotate therewith;
   a seal chamber outside the housing and in communication with the housing seal, the seal chamber including a cartridge seal ring attached to the housing, a shaft seal ring sealed to the shaft for rotation therewith, and a chamber seal spaced from the shaft between the rings and sealing with the rings;
   a lubricant filling the seal chamber; and
   means for pumping the lubricant into and out of said seal chamber and for inspecting the lubricant for contamination.

7. A bearing assembly in accordance with claim 6 wherein said housing seal comprises a labyrinth seal.

8. A bearing assembly in accordance with claim 7 wherein said labyrinth seal includes an O-ring at its inner surface adapted to be in contact with the shaft.

9. A bearing assembly in accordance with claim 6 wherein the seal ring attached to the shaft has an O-ring at its inner surface adapted to be in contact with the shaft.

10. A bearing assembly in accordance with claim 6 wherein said chamber seal includes a pair of seal halves each including a rigid portion having a flat radial surface in contact with the surface of the other half, and a flexible portion that seals with a respective ring and urges the rigid portions together.

11. A bearing assembly in accordance with claim 12 wherein each of said rings includes an annular dished portion that receives a flexible portion of a respective chamber seal half.

* * * * *